FIG. I

INVENTORS
GEORGE J. CROWDES,
HEINZ R. HAUSDORF &
BY GEORGE E. HAMMOND

Richard H. MacCutchen
ATTORNEY

Feb. 11, 1964   G. J. CROWDES ETAL   3,121,190
CONTINUOUS READING METER RELAY AND CIRCUITRY
Filed Aug. 12, 1959   2 Sheets-Sheet 2

INVENTORS
GEORGE J. CROWDES,
HEINZ R. HAUSDORF &
BY  GEORGE E. HAMMOND

ATTORNEY

United States Patent Office 3,121,190
Patented Feb. 11, 1964

3,121,190
CONTINUOUS READING METER RELAY
AND CIRCUITRY
George J. Crowdes, Chesterland, Heinz R. Hausdorf,
Novelty, and George E. Hammond, Cleveland, Ohio,
assignors to Assembly Products, Inc., Chesterland,
Ohio, a corporation of Ohio
Filed Aug. 12, 1959, Ser. No. 833,274
6 Claims. (Cl. 317—152)

The present invention relates to electrical control and has particular significance in connection with electrical circuits and mechanical arrangements for galvanometer-type meter relays provided with contacts.

It has long been known to employ electric contact devices of the type having a movable coil rotating within or about a permanent magnet to rotate a pointer thereby operating contacts or making or breaking an electrical circuit when a predetermined coil position is reached. Such a device has the advantage of extreme sensitivity but has a signal response so delicate it does not of itself develop sufficient torque to make reliable contact for control or indicating purposes. A booster coil, for the purpose of increasing the pressure between the contacts locking them together when they first meet, has been found useful as explained in many patents of the prior art, but one disadvantage heretofore has been the added expense, bulk, and maintenance difficulties caused by the necessity of providing additional apparatus to interrupt the locking coil current after it has served its function (in order that the meter may again be responsive only to sensitive coil current). Another disadvantage in the past has been that a single booster coil for both high and low limit locking has required a double (three wire) voltage source and made it impractical to tailor locking current to perform several functions for any one direction of pointer travel. An additional difficulty has been occasioned by the fact that the instrument whenever provided with a dial plate so as to serve as a meter in addition to its relay function could not provide scale readings outside of the limits determined by one or two (one for each direction of travel) relatively stationary limit of travel contacts. Another limitation in the prior art has been that passable contacts have never been provided which do not interfere with the reading of an associate meter scale. A still further inadequacy of prior devices has been that they have never provided a passable contact which is settable with respect to such a meter scale.

It is an object of the present invention to provide simple and inexpensive means for overcoming the above mentioned difficulties.

Other objects and advantages will become apparent, and the invention may be better understood from consideration of the following description, taken in connection with the accompanying drawing, in which.

In broad aspect, the present invention has its basis in our invention or discovery that in a contact making meter it is possible to obtain full scale readings while also obviating the need of any additional interrupter by providing one or more throwable relatively stationary contacts rotatably mounted to be actuated by, and placed out of the way of travel of, the contacts carried with the rotatable coil of the meter. Such contacts are pivotally mounted on a manually adjustable pointer settable with respect to a dial scale, so that trial and error is not needed to find set point.. We provide (for example for each direction of travel involved) two values of locking coil current, one for the purpose of locking the contacts together when they first meet, and a substantially stronger current for pushing the relatively stationary contact out of the way when the control function of the first locking coil current value has been accomplished. In this manner arrangements of the invention may be quite inexpensively made to permit scale readings outside of the limits of any relatively fixed contacts, as well as eliminating the need of any interrupting device such as an added relay, motor driven timer, neon glow lamp, etc.

Figure 1:
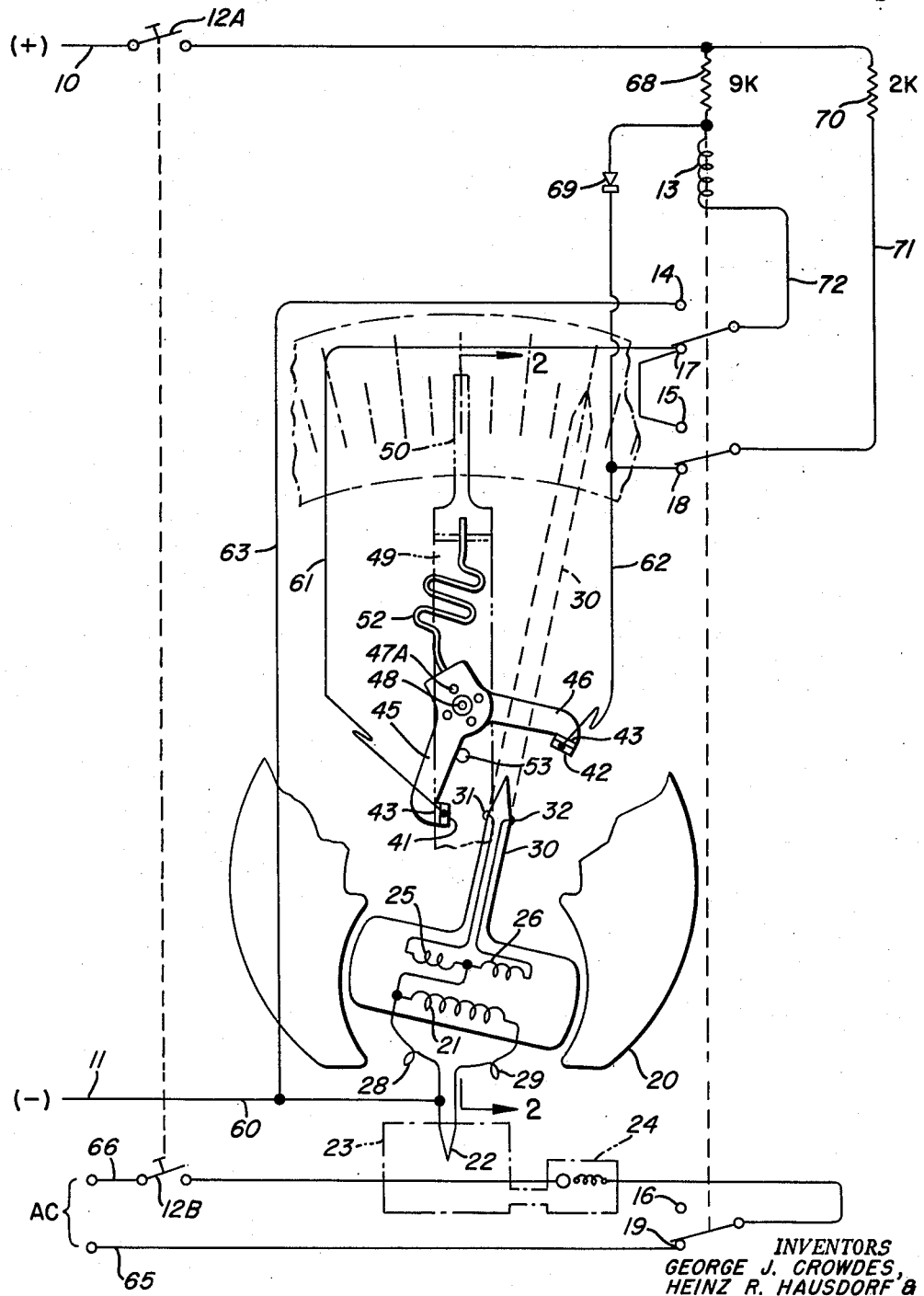
FIG. 1 is a diagrammatrical illustration of an improved electrical control and indicating system according to the present invention.

Referring now to FIG. 1, lines 10 and 11 may be assumed connected to a D.C. source of 150 volt power, operable through a control switch 12A to feed a load relay having a coil 13 for example through a holding contact 14 on the same relay. As shown the relay is provided with additional normally (when deenergized) open contacts 15, 16 as well as normally closed contacts 17, 18 and 19.

A contact meter is assumed provided with a permanent magnet 20 reactive to which a sensitive coil indicated diagrammatically at 21 turns responsive to changes in a minute quantity of sensitive coil current introduced as from a thermocouple 22 located in a space 23 which can be assumed to be a room-to-be-cooled as by an air conditioner apparatus 24. Mounted to rotate with coil 21 is a locking coil 25 which provides for one direction of travel an additional, boosting and locking torque as described in various issued patents including 2,576,371 to Thompson and Hammond. An additional locking coil 26 provides locking torque for the opposite direction of travel. The two locking coils are oppositely wound, as shown (or they could be oppositely connected instead) so as to produce torques in opposite directions when current from the respective "positive" throwable contact passes into one or the other of them.

As described in the Thompson and Hammond patent, the coil assembly may be mounted on steel pivots and turn in jewelled bearings with the action restrained by hair-springs, two of which, as indicated diagrammatically at 28 and 29, may also serve to carry current to and from the moving coil assembly. For indicating, a pointer 30 may co-operate with a suitably marked scale plate (as phantomed in and identified as 30s in FIG. 1) and either a separate pointer or, as illustrated, contact portions 31—32 of the indicating pointer may be used to mate with relatively stationary contacts at desired limits of travel, to complete the circuits for relaying and to cause additional locking torque to aid the sensitive coil torque at the time of contact mating thereby to avoid chattering of the contacts, arcing and circuit interruptions.

For providing relatively stationary while throwable contacts, in the illustrated embodiment of the present invention two contacts 41, 42 mutually insulated one from the other as by insulation 43 are shown mounted upon bifurcated arms 45, 46 of a collar or hub which may be formed by gluing or heat sealing small protrusions 47a associated with arm 46 within corresponding holes in a hub portion of the other arm 45. If desired separate insulation 43 can be eliminated by making the arms 45—46 themselves of insulation, or by sandwiching insulation in between the arms at the hub (see FIG. 2). Contacts 41, 42 and associate arms 45, 46, etc. are all mutually movable around a pivot 48 provided by a resilient bracket 49 cooperating with a main base 50 (see FIG. 2). The main base is an adjustable "set" pointer pivotal on the same axis as the moving coils 21, 25, 26 and indicating pointer 30, but the arms 45 and 46 also operate around another axis 48 which is shown parallel to the axis of the movable coil assembly of the meter. The operative radius of the contact making portions of the relatively stationary contacts 41, 42 relative to axis 48 is less than that of the contacts 31 and 32 relative to the axis of the movable coil assembly. The scale of the drawing is considerably expanded but in practice good results have been obtained with a ⅜" radius for pointer contacts 31 and 32 while the radius of the outer tips of the relatively stationary contacts 41 and 42 (with respect to 48) is 0.280".

The "toggle" of arms 45, 46 is in part restrained by a spring 52 operating to rotate the arms one way or the other against a stop post 53 carried on the "set" pointer 50.

In accordance with more or less conventional practice the ends of the locking coils 25, 26 are joined to pointer contacts 31, 32, respectively, and the opposite ends of the locking coils are joined to each other and, in order to save on the number of connections to be taken externally of the meter through the hair springs, this common junction is connected by a wire to one end of the sensitive coil 21 for a minus return back to the negative lead 11.

While other circuit arrangements might be used instead, in the illustrated embodiment the throwable contact 41 is connected through a lead 61 to relay contact 17 which is closed when the relay coil 13 is de-energized. The other relatively stationary throwable contact 42 is connected through a lead 62 to relay contact 18. The relay holding contact 14 is connected by a lead 63 to the negative lead 11.

An A.C. line indicated at 65, 66 is used to energize the air conditioner 24 through one pole of the master switch (contact 12B) and through the relay contact 19 as shown, contact 16 serving as a spare.

The D.C. circuit from line 10 through switch 12A is taken through a 9,000 ohm meter contact current limiting resistor 68 and from there to one side of the relay coil 13 while a branch circuit (for the purpose of shorting out the load relay coil to de-energize it at appropriate time) extends from the junction of resistor 68 and coil 13 through a rectifier 69 to the lead 62.

For the purpose of providing an increased value of locking current to enable the meter pointer contacts 31—32 to "throw the toggle" and thereafter operate outside of the limit of contacts 41—42, a 2,000 ohm resistor 70 is connected between the plus line and a lead 71 leading to the common (movable) portion of the relay contacts 15, 18, while a lead 72 extends from the negative side of coil 13 to the common (movable) portion of the contacts 14, 17.

Figure 2:
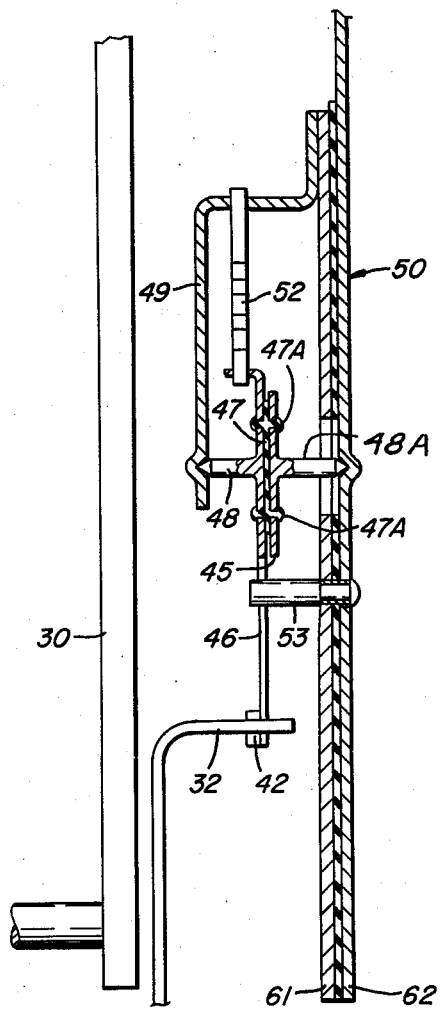
FIG. 2 is a cross sectional side elevation of a portion of the apparatus shown in FIG. 1.

FIG. 2 shows a desirable modification eliminating the need of insulation 43 and eliminating the need of mechanical movement accommodating slack in leads 61 and 62. In FIG. 2 a circuit may be traced from one throwable contact 42, through the bifurcated toggle member arm 46, through one portion 48 of the pivot, through the resilient bracket 49, and then through 61 which is one of a pair of mutually insulated laminations 61—62. Another circuit is traceable from the other throwable contact 41 (not shown in FIG. 2), through the other arm 45, through the other portion 48A of the pivot, through the other lamination 62 of the pair of mutually insulated laminations, and at or near the center of the adjustable "set pointer" thus formed additional stationary laminations may be used to convey current to or from the two mutually insulated laminations 61—62 in a very effective manner because, as by using mating stationary mutually insulated conductive laminations, very large areas of wiping contact are available. Whenever desired the spring 52 may be used to provide a parallel circuit with respect to the arm and contact (46 and 42 in FIG. 2) with which it is electrically associated.

The equipment just described enables the reading of a whole scale (both to either side outside and also inside the toggle) and the arrangement of the throwable contacts, mutually mechanically mounted so that each can throw the other into operative position, is settable with respect to the very same scale plate (30s) on which the signal indicated by pointer 30 is read, and the equipment is always self-starting as may be best understood from consideration of typical operation as follows:

In order to snap the spring loaded toggle a locking coil current is applied which is approximately four times greater than is necessary for merely closing the contacts. The higher value of locking coil current overcomes the toggle spring to push the adjacent throwable contact out of the way after the lower or normal value of locking coil current has completed its control function. However, depending upon the time constants of the particular relay system used, it is not always necessary to have any normal locking coil current value because, if the relay will operate fast enough, the initial mating of the locking contacts may suffice to operate the load relay even if the locking coil current is great enough to snap the toggle mechanism.

Supposing that the adjustable set pointer has been set to "toggle up" or "toggle down" (or "toggle up and toggle down," whenever the arrangement is so constructed that it will do either at the same signal condition) at a particular temperature, and supposing that with the arms 45, 46 in a rightward position as shown in FIG. 1 the entire apparatus has been shut shown for some hours (switch 12 open) and the pointer 30, assumed in this case to indicate temperature in the space 23, has taken the "warm" position shown in FIG. 1. At this time the relay coil 13 is de-energized and the relay contacts take the position shown in FIG. 1. Then, when the control switch 12 is closed, since the relay is not yet energized, the cooler 24 will commence operation and continue until the space 23 is cooled to the point where pointer contact 31 engages relatively stationary contact 41, completing a circuit from line 11, through locking coil 25, contacts 31—41, lead 61, contact 17, lead 72, coil 13, resistor 68, switch 12A, to plus lead 10, and the relay will pull in and be held closed through contact 14. As a next step the lower value of resistor 70 comes in to play, and a circuit can be traced therefrom through connection 71, contact 15, lead 61, contacts 41—31, and through the locking coil 25 to line 11. This causes an increased torque which will snap the toggle so that 41 is out of the way of further movement of the pointer 30 which is then free to indicate temperature values lower than the temperature required to shut down the cooling through opening of relay load contact 19 and de-energization of apparatus 24.

Ultimately the space 23 may be expected to again heat up due to ambient and the pointer 30 will travel to the right until contact 32 mates with 42, completing a circuit from line 11 through locking coil 26, contacts 32—42, lines 62 and through rectifier 69 to short out coil 13 and cause the relay to release since, as is old in the art, locking coil 26 impedance is selected so low that the connection through locking coil 26 draws enough current through resistance 68 so that the remaining current in coil 13 is insufficient to hold the relay armature in against the force of a spring, or gravity or whatever is used to normally pull the relay armature away from its magnet. As the relay releases, a circuit is completed from the plus line through the lower value of resistor 70, line 71, contact 18, line 62, and contacts 42—32, to impose a higher locking coil current on 26 and snap the toggle so that the meter pointer 30 is free to record temperatures outside the upper limit of control, while at the same time relay contact 19 recloses to re-energize the air conditioner apparatus and bring down the temperature of space 23 whereupon the cycle repeats.

There is thus provided self-starting apparatus of the class described capable of meeting the objects above set forth, and whereby the provision of limited motion, torque movable contacts which are locking action displacement contacts, and the necessary forces to throw them permit the reading of full scale together with control limits within only a portion of full scale, while at the same time eliminating the need of any separate apparatus for interrupting the locking coil circuit, and permitting adjusting of set point or points according to positioning with respect to the very same scale which is used to read sensitive pointer indication. Thus apparatus according to the invention assists in miniaturization and permits of instantaneous action since there is no need of any manual or motor drive reset. At the same time such arrangements greatly extend the life of the meter contacts because elimination of conventional interrupter apparatus means that the meter will not be constantly trying a contact closing position with interruption again and again. Another decided advantage of apparatus according to the invention is that all control functions are maintained even when the needle is outside of predetermined (control operating) high and low limits.

While we have illustrated and described a particular embodiment and applied our considerations to temperature control, various modifications may obviously be made without departing from the true spirit and scope of the invention which we intend to have defined only by the appended claims taken with all reasonable equivalents.

We claim:

1. An electrical control system comprising in combination a galvanometer type meter having cooperating first and second contacts with the first pivotal about a first axis and the second spring biased and pivotal about a second axis with the contacts and axes so arranged that, when the contacts are in engagement, movement of the first contact can throw the second contact to a position in which their engagement is not possible, and having a sensitive coil and at least one locking coil connected in the circuit of the first contact to add a contact closing force additional to that of the sensitive coil, voltage supply means for energizing the locking coil circuit with a first value of current to assist contact mating when the contacts close, and voltage supply means providing a different and higher voltage for energizing the locking coil circuit with a higher value of current sufficient to cause said first contact to throw said second contact to the position at which engagement of the contacts is not possible.

2. An electrical control system as in claim 1 further characterized by the first and second axes being parallel, the first contact being rotatable about the first axis which is also the axis of the sensitive and locking coils, the second contact being pivotal about the second axis and at a radius which is substantially less than the radius of operation of the first contact about the first axis, whereby the first contact may act as a throwing contact throwing the second when said higher value of locking coil current is provided.

3. An amplifier circuit comprising a rotatable part carrying a sensitive coil and additionally carrying at least one locking coil and electrically in series with said locking coil carrying rotatable contact means, a pivotally mounted spring biased part having bifurcated arms separately carrying relatively stationary contact means with the parts configured and arranged so when operating from beyond the limit of the toggle the rotatable contact means passes by the part arm closer to it and strikes the contact on the further arm, a load relay having a coil arranged to be energized in series with the locking coil when the rotatable contact means first mates with the contact means on at least one of the bifurcated arms, auxiliary contacts on the load relay arranged in a circuit for imposing an added surge of current through the locking coil for pulling the movable contact means through the contact on the associate bifurcated arm by pushing said arm out of the way whereby to break the locking coil circuit without added interrupter equipment and whereby the apparatus is then left operative according to sensitive coil current alone until the movable contact means mates with the relatively stationary contact means on the other arm of the toggle and whereby sampling the signal is rendered unnecessary and consequently many auxiliary control components are eliminated while control action is directly linked to signal and is therefore smoother, faster and foolproof.

4. In an electrical meter of the type having a signal coil rotatable by reaction with a magnet, a reference scale, a signal coil position indicator cooperative with said reference scale for viewing, a control contact carried by said signal coil position indicator, a throwable control contact wihch is pivotally mounted so that it may assume a first position at which it is arranged to mate with the control contact carried by the signal indicator and may assume a second or thrown position in which it is not engageable by the control contact carried by the signal indicator, means including a spring for assuring movement of said throwable control contact from its first to its second position when such movement is initiated by the indicator carried control contact, means including a second throwable contact mechanically associated with the spring and the first throwable contact for returning the first throwable contact from second to first position, and an adjustable set pointer on which both throwable contacts and the spring are mounted and which adjustable pointer is cooperative for viewing with said reference scale to indicate the adjusted position at which throwable contact actuation may take place.

5. An electrical control system comprising an electrical meter as in claim 4 further characterized by: a direct current power supply; a relay having a coil operative in a circuit comprising said supply and contacts of the meter; said relay having a coil and having relatively heavy contacts for controlling practical electrical loads; said relay having first additional contacts connected in circiuts comprising said supply, meter contacts, and relay coil so that when the signal responsive moving contact of the meter makes electrical connection with either of the throwable control contacts, current may, depending upon the position of the relay control contacts, flow locking otgether meter contacts and energizing the control relay coil; and second additional control contacts on said relay connected in circuit for energizing the engaged contacts and locking coil means of the meter thereafter whereby when the relay has completed its movement due to energization of its coil, said last mentioned control contacts cooperate to provide additional current to the already energized locking coil and the meter throwable contact involved may be thrown out of the way to permit the signal coil of the meter to move freely in the scale range above or below the adjustable position of the throwable contacts.

6. In a meter of the type having a movable signal coil rotatable by reaction with a permanent magnet, an indicating pointer and movable contact means rotatable with the movable signal coil, a pair of relatively stationary contacts for mating with the movable contact means each for a different direction of travel, locking coil means mounted for rotation with the movable coil and electrically connected in series with the movable contact means, a manually adjustable pointer, a V-shaped toggle pivotally mounted at its apex on the adjustable pointer and with the arms of the V each providing an insulated mounting of one of the relatively stationary contacts for mating with the movable contact means according to position of the toggle, means including connections for applying a voltage to the signal coil, means including connections for applying a voltage to the locking coil means, said means including connections for applying a voltage to the locking coil means including separate circuits and resistances for providing for each direction of travel two values of locking coil current, one for the purpose of locking contacts together when they first meet, and a substantially stronger current for pushing the associate relatively stationary contact out of the way when the control function of the first locking coil current is accomplished.

References Cited in the file of this patent
UNITED STATES PATENTS

| | | |
|---|---|---|
| 2,042,109 | Lamb | May 26, 1936 |
| 2,109,872 | Uehling | Mar. 1, 1938 |
| 2,528,336 | Bristol | Oct. 31, 1950 |
| 2,574,399 | Lamb | Nov. 6, 1951 |
| 2,576,371 | Thompson | Nov. 27, 1951 |